United States Patent [19]
Yamada et al.

[11] Patent Number: 5,702,664
[45] Date of Patent: Dec. 30, 1997

[54] METHOD OF AND APPARATUS FOR EXTRUSION-MOLDING A LAMINATED PARISON, AND A VESSEL PRODUCED FROM THE LAMINATED PARISON

[75] Inventors: Yosuke Yamada; Shigeaki Sano; Toshiji Yoshida; Toshio Kagitani, all of Yokohama, Japan

[73] Assignee: The Japan Steel Works, Ltd., Tokyo, Japan

[21] Appl. No.: 574,458

[22] Filed: Dec. 15, 1995

[30] Foreign Application Priority Data

Oct. 6, 1995 [JP] Japan .................................. 7-260324

[51] Int. Cl.⁶ .......................... B29C 47/26; B29C 49/22
[52] U.S. Cl. ............ 264/515; 264/171.28; 264/173.15; 425/133.1; 425/532; 425/462
[58] Field of Search .......................... 264/514, 515, 264/540, 541, 171.26–171.28, 173.13, 173.15; 425/133.1, 131.1, 132, 462, 467, 532

[56] References Cited

U.S. PATENT DOCUMENTS

| | | | |
|---|---|---|---|
| 2,859,476 | 11/1958 | Lainson | 425/462 |
| 3,322,869 | 5/1967 | Scott, Jr. | 264/515 |
| 3,345,444 | 10/1967 | Pratt | 264/515 |
| 3,962,396 | 6/1976 | Ono et al. | 264/171.27 |
| 4,522,775 | 6/1985 | Briggs et al. | 264/514 |
| 5,156,857 | 10/1992 | Wang et al. | 264/37 |
| 5,186,875 | 2/1993 | Fukuhara | 264/514 |
| 5,206,032 | 4/1993 | Bock | 425/532 |
| 5,230,935 | 7/1993 | Delimoy et al. | 264/176.1 |
| 5,443,874 | 8/1995 | Tachi et al. | 428/36.7 |

FOREIGN PATENT DOCUMENTS

| | | | |
|---|---|---|---|
| 3-106632 | 5/1991 | Japan | 264/515 |
| 4-282206 | 10/1992 | Japan | 264/514 |

*Primary Examiner*—Jeffery R. Thurlow
*Attorney, Agent, or Firm*—Brooks Haidt Haffner & Delahunty

[57] ABSTRACT

An extrusion molding apparatus includes a die head with first, second, third and fourth annular nozzles. An adhesive extruder is connected to the first and third nozzles, a barrier extruder is connected to the second nozzle and a reclaimed material extruder is connected to the fourth nozzle. Inner and outer main material flow passages are connected to a main material extruder, as well. The annular nozzles and the main material flow passages are connected to an extrusion nozzle for forming a parison. The barrier material extruder has a cylinder which is connected to the second nozzle. A screw lies within the cylinder. The second nozzle has a ridge opposite an end of the screw, for dividing the extruded barrier flow material, mitigating stagnation of the barrier material as it passes through the second nozzle. A method of forming a parison is described, as well.

3 Claims, 5 Drawing Sheets

METHOD OF AND APPARATUS FOR EXTRUSION-MOLDING A LAMINATED PARISON, AND A VESSEL PRODUCED FROM THE LAMINATED PARISON

FIELD OF THE INVENTION

The present invention relates to a method of and an apparatus for extrusion-molding a laminated parison, and a vessel produced from the laminated parison, and in particular to a novel improvement therein for making it possible to mold a vessel which has a highly effective barrier nature to gasohol which contains alcohol.

BACKGROUND OF THE INVENTION

An example of such method and apparatus for extrusion-molding a laminated parison hitherto used is shown in FIGS. 1 and 2.

In FIGS. 1 and 2, reference numeral 6 denotes a multi-ring structure of a generally cylindrical die head 1. The multi-ring structure 6 comprises circular fluid passages including an inner passage 5 for a main material, a first annular nozzle 2, a second annular nozzle 3, a third annular nozzle 4, and an outer passage 5A for the main material. The inner and outer passages 5 and 5A for the main material are connected to a main-material extruder 7 provided on an upper portion of the die head 1.

The first and third annular nozzles 2 and 4, respectively, are connected to another extruder 8 for an adhesive material. The second annular nozzle 3 is connected to a further extruder 9 for a barrier material.

The operation is as follows. The main material 7a, adhesive material 2a and 4a, and barrier material 3a extruded by the extruders 7, 8 and 9, respectively, are thrust out of a circular extrusion nozzle 23 to form a laminated parison 70, which is only partly shown in FIG. 2, and which is made of three different materials and has a five-layered wall structure.

A polyamide is used as the barrier material 3a.

The prior art laminated parison extruding method and apparatus has the following problems caused by the above described arrangement.

Conventionally used polyamides cannot have a barrier nature to gasohol containing e.g. 15% of alcohol. As an alternative to polyamides, ethylene-vinyl-alcohol copolymer resin (abbreviated EVOH; referred to as "EVAR") has come into use. In the above described arrangement, however, a dedicated accumulator and a flow rate regulator are provided, although not shown, between the second annular nozzle for supplying the barrier material and the extruder; the passage of the barrier material has a long length of up to 2 meters. Since the EVOH has a poor thermal stability, it will be cooled and degraded accordingly when introduced into such a long passage. It is difficult to shape a parison including such degraded EVOH to obtain high quality moldings, e.g. a fuel tank.

When EVOH is used which is thermally unstable remarkably as compared with nylons, it is impossible to achieve high quality moldings through the operation of the prior art arrangement having a die head associated with long passages in which EVOH is subjected to thermal decomposition and burning.

SUMMARY OF THE INVENTION

The invention was made in an attempt to solve the above problems. An object of the present invention is, therefore, to provide a method of and an apparatus for extrusion molding a laminated parison which can be shaped into a vessel exhibiting a remarkable barrier nature to gasohol containing alcohol, as well as to provide a vessel using the laminated parison.

In a method of extrusion molding a laminated parison comprising at least inner and outer main materials, first and second adhesive materials, and a barrier material, said materials being extruded through a plurality of first, second and third annular nozzles and inner and outer main material flow passages, said nozzles and passages being provided in a die head, the improvement according to the present invention comprises:

EVOH is used as said barrier material;

a screw of an extruder for extruding said barrier material is inserted into said die head; and a reclaimed material is shaped into a layer inside said outer main material flow passage through a fourth annular nozzle, whereby a laminated parison is achieved which comprises six layers made of four different materials: namely, said inner main material layer, first adhesive layer, barrier material layer, second adhesive material layer, reclaimed material layer and outer main material layer.

In an extrusion molding apparatus according to the present invention comprising a die head provided with a plurality of first, second and third annular nozzles and inner and outer main material flow passages through which inner and outer main materials, first and second adhesive materials, a reclaimed material and a barrier material can be extruded to form a laminated parison; the extruder for extruding said barrier material has a cylinder which is connected to the second annular nozzle for supplying the barrier material and which is positioned to extend into said die head; said cylinder being provided with a screw therein; said second annular nozzle being provided with a ridge which is situated opposite to said screw; the fourth annular nozzle for supplying said reclaimed material being formed by a cap ring and a first spider ring of said die head; said fourth annular nozzle being connected to a groove which is formed in an end surface of said first spider ring; and said fourth annular nozzle being situated inside said outer main material flow passage.

In accordance with a further aspect of the invention, EVOH is used as said barrier material.

A vessel according to the present invention is produced by blow molding the four-materials six-layered laminated parison as defined in claim 1.

The vessel according to the present invention is produced by blow molding a laminated parison which has been molded by the laminated parison extruder as defined in claim 2.

Thus, in accordance with the invention, the screw of the barrier material extruder for supplying EVOH to be a component of a laminated parison is provided such that its front end faces the second annular nozzle in the multi-ring structure of the die head, whereby the thermally unstable EVOH can be fed from the cylinder of the barrier material extruder directly into the second annular nozzle. The EVOH can thus be supplied to form a laminated parison without thermal decomposition, burning or thermal degradation, whereby an increase in quality of molding may be achieved. Further, the ridge provided in the second annular nozzle will serve to separate molten EVOH into flows in opposite directions, whereby molten EVOH is distributed into a circular form without stagnation, thereby to form a layer having a uniform thickness. In addition, a flow passage for a reclaimed material may be formed in the die head without the necessity of enlarging the die head, by virtue of the fact that a fourth annular nozzle is formed such that it is connected to the groove in the end surface of the first spider ring of the die head so that the reclaimed material can be supplied.

BRIEF DESCRIPTION OF THE DRAWINGS

Preferred embodiments of a laminated-parison extrusion-molding method and an apparatus therefor, and of a vessel produced using the laminated parison will now be described in detail with reference to the accompanying drawings, in which those parts or elements which have identical or similar counterparts in the prior art example are designated by identical reference numerals, and in which.

DETAILED DESCRIPTION OF THE PREFERRED EMBODIMENTS

Figure 1:
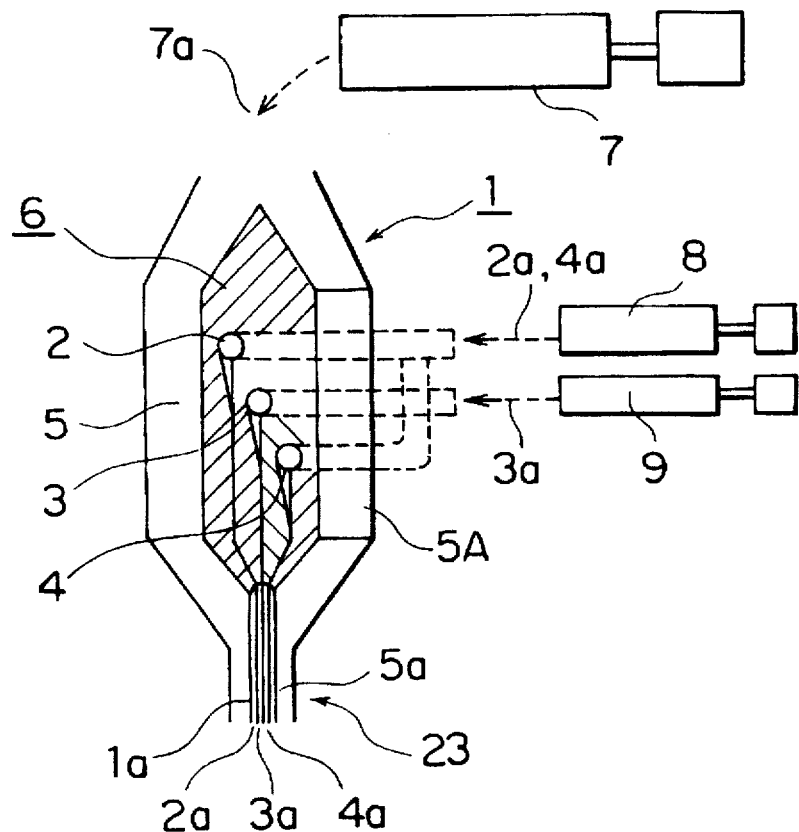
FIG. 1 is a sectional view showing the arrangement of a prior art extrusion molding apparatus.
Figure 2:
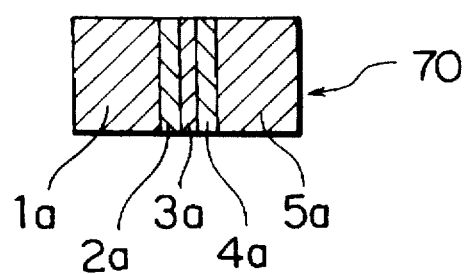
FIG. 2 is a partial sectional view showing a prior art laminated parison.
Figure 3:
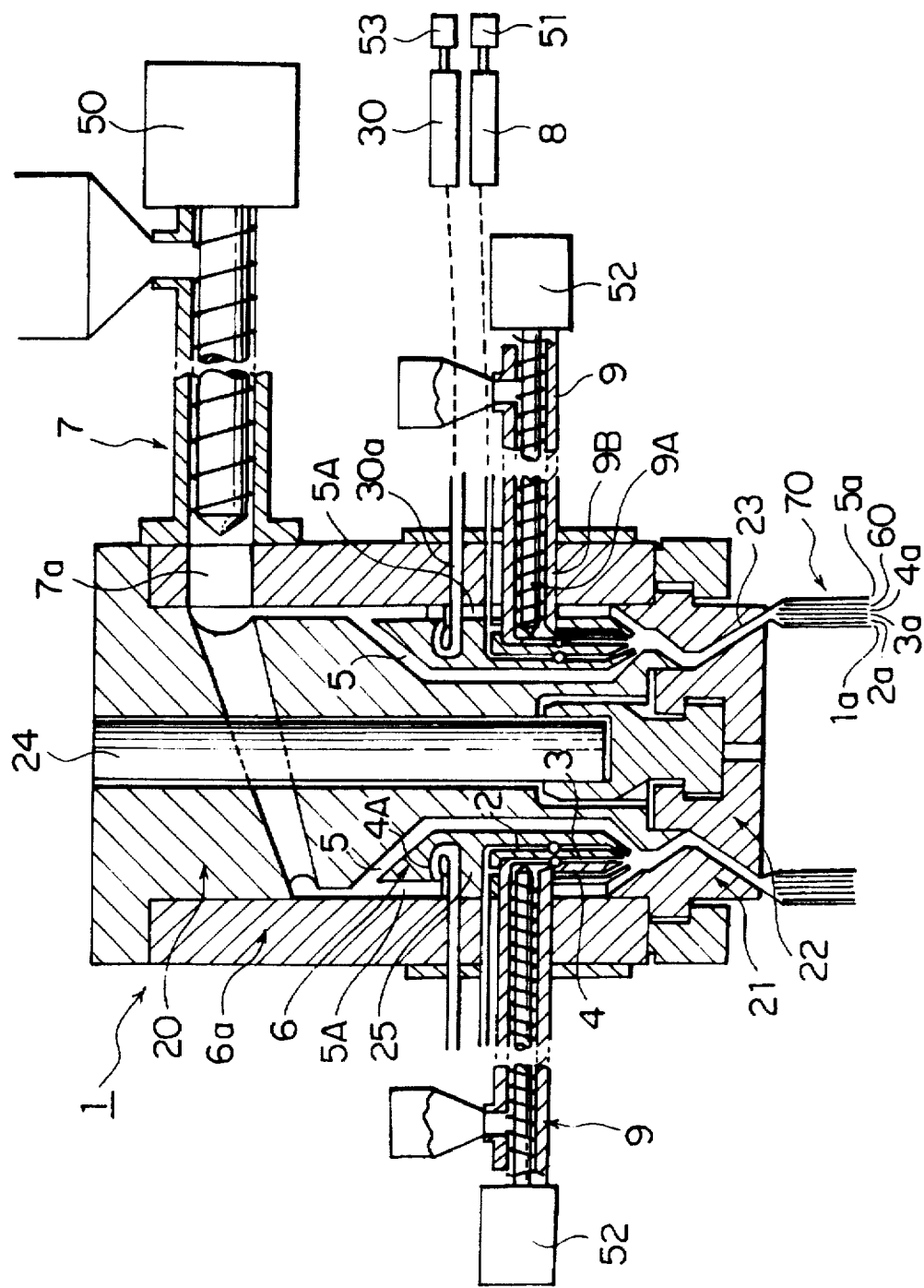
FIG. 3 is a sectional view showing the arrangement of a laminated-parison extrusion-molding apparatus according to the present invention.

FIG. 3 shows, in section, an embodiment of the laminated-parison extrusion-molding apparatus according to the invention.

Figure 4:
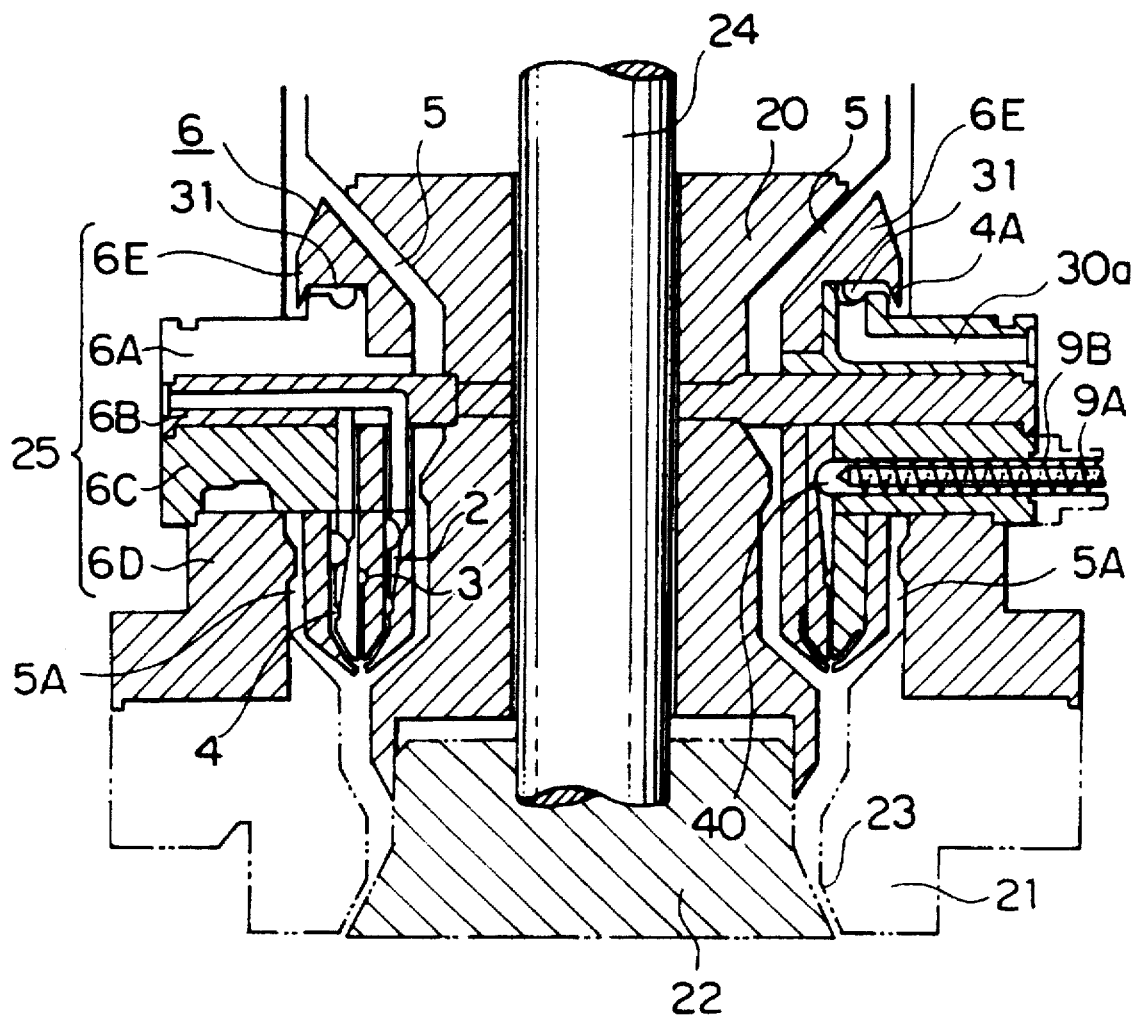
FIG. 4 is an enlarged sectional view, taken along a line different from that of FIG. 3, showing principal parts or elements of FIG. 3.

In FIG. 3, reference numeral 1 denotes a generally cylindrical die head comprising a head body 6a having a head core 20 mounted therein. A cylindrical inner and outer main material flow passages 5 and 5A, respectively, are formed by the head core 20 inside the head body 6a. These main material flow passages 5 and 5A are connected to a main material extruder 7 provided on an upper portion of the die head 1. FIG. 4 shows an enlarged sectional view of the die head 1, which is taken along a line different from that of FIG. 3.

The main material flow passages 5 and 5A are connected to an extrusion nozzle 23 which is formed by an outer die tube 21 and an inner die tube 22. A nozzle gap of the extrusion nozzle 23 can be freely adjusted by moving a vertical rod 24 upwardly or downwardly to thereby move the inner die tube 22 together with the rod 24, whereby the wall thickness of the laminated parison produced by the die head 1 can be freely adjusted.

Figure 5:
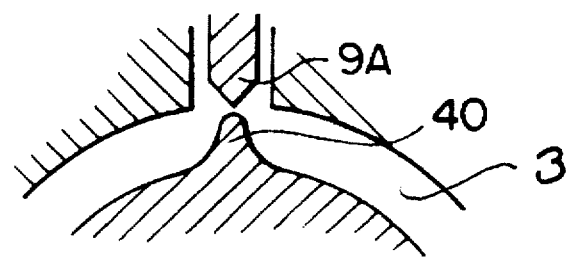
FIG. 5 is a sectional plan view showing principal parts or elements of FIG. 4.
Figure 6:
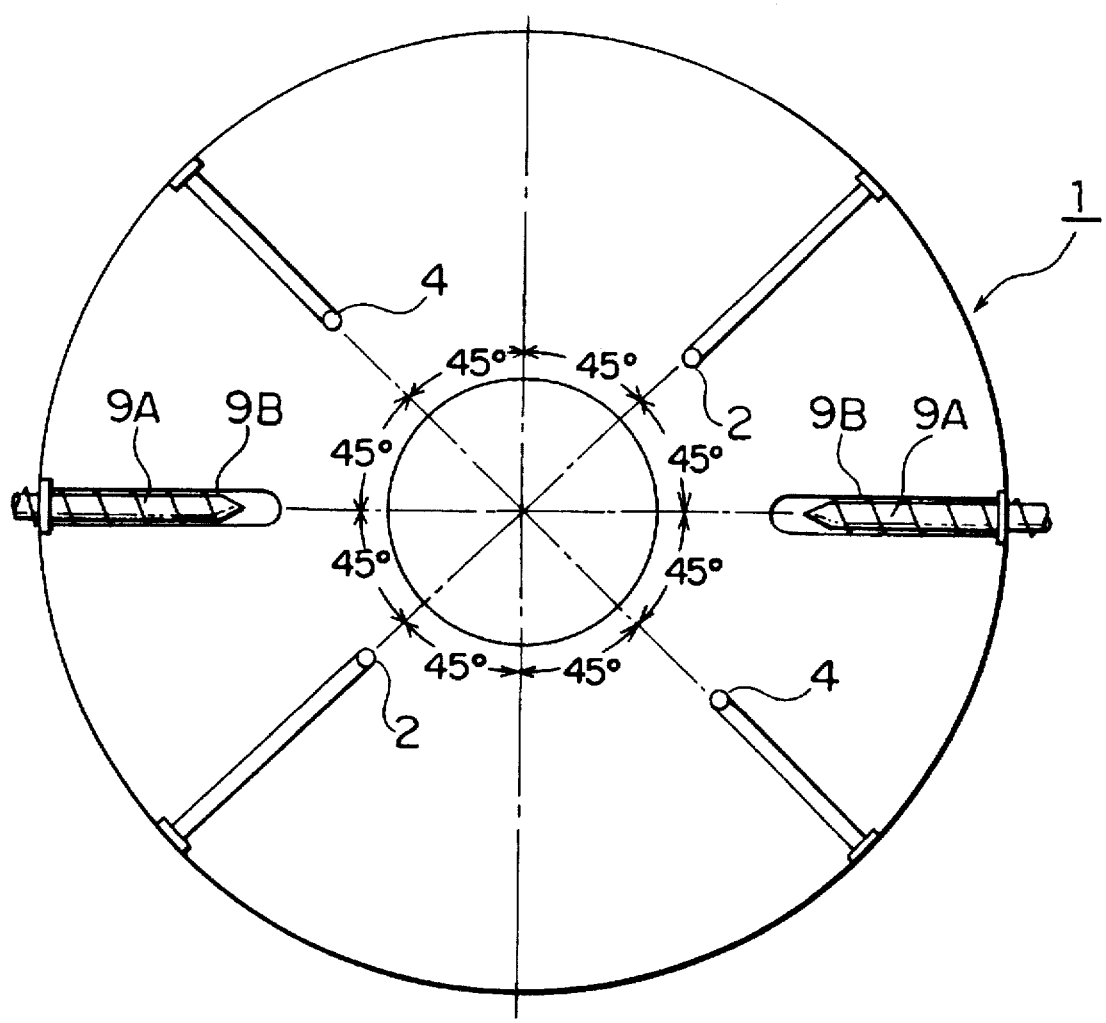
FIG. 6 is a plan view showing principal parts or elements of FIG. 4.
Figure 7:
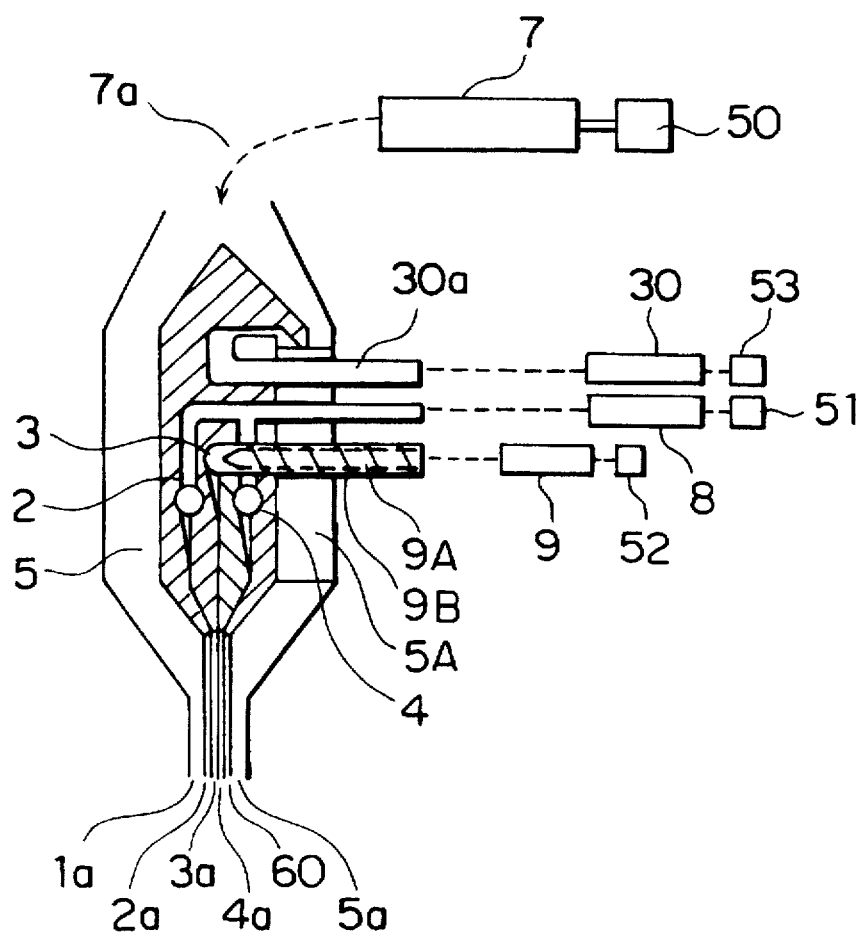
FIG. 7 is a sectional view showing the arrangement of principal parts or elements of FIG. 3.

The multi-ring structure 6 comprises: first, second, third and fourth spider rings 6A, 6B, 6C and 6D, respectively, which in combination form a spider 25; and a cap ring 6E, as shown in FIG. 4. The spider rings 6A–6D and the cap ring 6E form in combination first, second, third and fourth annular nozzles 2, 3, 4 and 4A, respectively, which are arranged in a concentric manner. The first and third annular nozzles 2 and 4 are connected to an adhesive material extruder 8. The second annular nozzle 3 is connected to a barrier material extruder 9 which is for extruding a barrier material which consists of well known ethylene-vinyl-alcohol copolymer resin (EVOH) which is of a barrier nature to gasohol containing alcohol. The main material flow passages 5 and 5A, and the annular nozzles 2, 3, 4 and 4A are concentrically arranged inside the die head 1. The fourth annular nozzle 4A is connected to a reclaimed-material extruder 30 which is for extruding in a laminar manner a reclaimed material, which is obtained, for example, by crushing burrs reclaimed from molded products. The fourth annular nozzle 4A is formed between the cap ring 6E and the first spider ring 6A, and is situated to face the inside of the outer main material flow passage 5. A flow passage 30a from the reclaimed material extruder 30 is connected to the fourth annular nozzle 4A through a groove, shown in FIG. 4, which is formed in an end surface of the first spider ring 6E. A ridge 40 is formed in the second nozzle 3 at a position which faces a front end of a screw 9A of the barrier material extruder 9, as shown in FIG. 5. The ridge 40 serves to bisect the flow of the extruded barrier material, whereby the material can be uniformly supplied into and uniformly spread within the second annular nozzle 3 without stagnation.

In case of the extruders 7, 8, 9 and 30, the barrier-material extruder 9 in particular is arranged such that its cylinder 9B is inserted into and fixed to the die head 1 or the multi-ring structure 6. Thus, the molten resin barrier material 3a can be directly supplied into the second annular nozzle 3 without any substantial decrease in temperature, and without thermal decomposition, burning or thermal degradation of the material. Further, any of the other extruders 7, 8 or 30 may be inserted into the die head 1 as said extruder 9 is.

Figure 8:
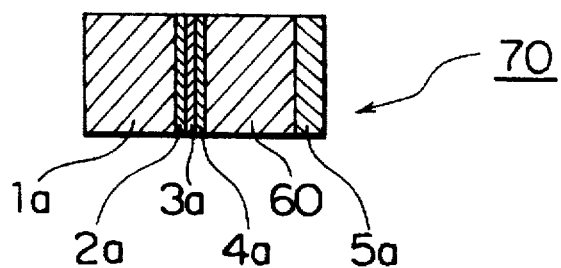
FIG. 8 is a partial sectional view showing a laminated parison according to the present invention.

The operation is as follows. The extruders 7, 8, 9 and 30 are driven by respective drivers 50, 51, 52 and 53 comprising known hydraulic cylinders or rotating apparatus. By the thus driven extruders, inner and outer main material flows 1a and 5a, respectively, first and second adhesive material flows 2a and 4a, respectively, and a barrier material flow 3a are intermittently or continuously extruded and supplied into the inner and outer main material flow passages 5 and 5A, respectively, and into the annular nozzles 2, 3, 4 and 4A. A four-different-materials six-layered laminated parison 70 is thus obtained from the extrusion nozzle 23. The parison 70 has a wall structure consisting of six layers: outermost and innermost layers of the main material; a core layer of the barrier material 3a; a pair of first and second adhesive material layers 2a and 4a, respectively, the first adhesive material layer 2a being situated between the inner main material layer 1a and the barrier material core layer 3a, the second adhesive material layer 4a being situated between the outer main material layer 5a and the barrier material core layer 3a; and a layer of the reclaimed material 60 situated between the outer main material layer 5a and the second adhesive material layer 4a. An excellent parison 70 shown in FIG. 8 has been obtained through the operation of the above described apparatus in which the cylinder 9B for extruding the barrier material 3a is inserted into the die head 1 so as to remarkably reduce the length of the flow passage for the barrier material as compared with a prior art apparatus, and in which the extruded barrier material can be uniformly distributed inside the die head by virtue of the presence of the ridge 40. Such an arrangement of the inventive apparatus makes it possible to overcome the problems of thermal decomposition or burning of the molten resin caused by its stagnation. By blow molding the laminated parison 70 by means of a blow molding apparatus not shown, a container, e.g. a gasoline tank, having a four-different-materials six-layered wall structure can be achieved, which includes a core layer of said barrier material which exhibits a barrier nature to methanol, ethanol or the like. A vessel may thus advantageously be achieved which includes the highly effective barrier material, ethylene-vinyl-alcohol copolymer resin or EVOH; hitherto, it was impossible to achieve such a container. Further, in accordance with the present invention, wastes may be reclaimed from blow-moldings for use in the reclaimed material layer 60 which is extruded from the extruder 30, such reclaimed material layer 60 being situated inside the outer main material layer 5a as an extender therefor. The reclaimed material 60 extruded from the extruder 30 is supplied via the groove 31 formed in the end surface of the first spider ring 6A into the fourth annular nozzle 4A. The formation of such groove 31 in the end surface makes it possible to more efficiently utilize the space inside the multi-ring structure 6.

With respect to the arrangement of the flow passages from the extruders 7, 8, 9 and 30 to the extrusion nozzle 23 in the above described embodiment, only a single example has been described and shown. Naturally, modified versions of such example will achieve advantages similar to those as described above. Namely, said parison 70 is composed of said layer 1a of 40%, said layer 2a of 3%, said layer 3a of 3%, said layer of 3%, said material 60 of 40% and said layer of 11%.

The EVOH has a nature which makes it suitable for use in a continuous molding operation, although an intermittent molding operation is also possible with EVOH.

The inventive laminated-parison extrusion-molding and apparatus and the container produced using such laminated parison, which are arranged in a manner as described and shown, can achieve the following advantages:

Of the extruders provided in the apparatus, in particular the extruder for the barrier material has its cylinder arranged such that its front end extends into the spider ring, i.e. a component of the multi-ring structure of the die head. An extreme reduction has thus been achieved in length of the flow passage for such barrier material resin. In addition, the provision of the ridge within the annular nozzle serves to uniformly distribute the barrier material in a circular form without its stagnation. The inventive arrangement thus makes it possible to overcome the problems of thermal decomposition or burning of the molten resin caused by its stagnation within the flow passage, thereby allowing a stable barrier material layer to be formed. The use of the reclaimed material allows recycling waste materials. The arrangement thus makes it possible to achieve a four-different-materials six-layered parison and a container using such parison, which has a highly effective barrier nature, without the necessity of enlarging the die head.

Thus, in accordance with the invention, it is possible to produce a vessel, e.g. a gasoline tank, which includes as a component thereof a highly effective barrier material, i.e. ethylene-vinyl-alcohol copolymer resin or EVOH.

What is claimed is:

1. In a method of extrusion molding a laminated parison comprising at least inner and outer main materials, first and second adhesive materials, and a barrier material, the method comprising extruding said materials through a plurality of first, second and third annular nozzles, and inner and outer main material flow passages from an adhesive material extruder which is connected to said first and third annular nozzles, a barrier material extruder which is connected to said second annular nozzle, and a main material extruder which is connected to said inner and outer material flow passages, wherein said first, second and third annular nozzles and said inner and outer main material flow passages are connected to an extrusion nozzle, said nozzles and passages being provided in a die head, the improvement comprising:

using EVOH as said barrier material;

extruding said EVOH from an end portion of a screw of said barrier material extruder inserted into said second annular nozzle, such that said end portion is opposite a ridge formed in said second annular nozzle;

dividing said barrier material by said ridge;

shaping a reclaimed material through a fourth annular nozzle; and extruding said materials through said extrusion nozzle whereby a four-different-materials six-layered laminated parison is achieved which comprises six-layers made of four different materials: namely, said inner main material layer, first adhesive layer, barrier material layer, second adhesive material layer, reclaimed material layer and outer main material layer.

2. An extrusion molding apparatus comprising a die head provided with an extrusion nozzle; a plurality of first, second, third and fourth annular nozzles, and inner and outer main material flow passages, each of said annular nozzles and said flow passages having first ends connected to said extrusion nozzle; a main material extruder connected to a second end of said inner and outer main material flow passages; an adhesive material extruder connected to a second end of said first and third annular nozzles; a reclaimed material extruder connected to a second end of said fourth annular nozzle; and a barrier material extruder connected to a second end of said second annular nozzle, for extruding inner and outer main materials, first and second adhesive materials, a reclaimed material and a barrier material, respectively, through said extrusion nozzle to form a laminated parison;

the barrier material extruder having a cylinder connected to said second annular nozzle for supplying the barrier material, said cylinder extending into said second annular nozzle;

said cylinder including a screw therein, said screw having an end portion;

said second annular nozzle having a ridge situated opposite to said end portion of said screw (9A), whereby said barrier material core layer which is extruded from said end portion of said screw is divided by said ridge as it enters said second annular nozzle; and said fourth annular nozzle for supplying said reclaimed material being formed by a cap ring and a first spider ring of said die head, said fourth annular nozzle being connected to a groove which is formed in an end surface of said first spider ring, and said fourth annular nozzle being situated inside said outer main material flow passage.

3. The laminated-parison extrusion-molding apparatus as claimed in claim 2, wherein EVOH is used as said barrier material.

\* \* \* \* \*